March 12, 1968 C. T. WYRICK 3,373,412

MULTIAPERTURE MAGNETIC CORE DEVICE HAVING A DYNAMIC READOUT

Filed April 17, 1964

INVENTOR.
CHARLES THOMAS WYRICK
BY Curtis, Morris & Safford

United States Patent Office 3,373,412

Patented Mar. 12, 1968

3,373,412

MULTIAPERTURE MAGNETIC CORE DEVICE HAVING A DYNAMIC READOUT

Charles Thomas Wyrick, Camp Hill, Pa., assignor to AMP Incorporated, Harrisburg, Pa.

Filed Apr. 17, 1964, Ser. No. 360,591
1 Claim. (Cl. 340—174)

ABSTRACT OF THE DISCLOSURE

A multiaperture magnetic core having two major apertures defining two intelligence bit positions is disclosed including a readout winding linking a first major aperture and the material therearound to a utility device. The magneic material surrounding a second major aperture includes therein a minor transmitter aperture containing a coupling loop linking the first major aperture and a circuit is provided to provide an output responsive to a transfer of intelligence by said coupling loop.

This invention relates to an improved circuit and technique for accomplishing read-out of saturable magnetic cores.

In U.S. patent application Ser. No. 305,780 filed Aug. 30, 1963, in the name of David Nitzan and J. P. Sweeney, entitled, Multi-Aperture Magnetic Core Device, there is shown and described a new magnetic core which incorporates in a single core structure, at least two bit positions. In working with cores of the type described in application Ser. No. 305,780, a discovery has been made concerning an improved discrimination between binary One and Zero intelligence. This discovery is applicable to other core geometries and shapes, but for convenience will be disclosed relative tothe core of the application Ser. No. 305,780.

To a degree there is some problem with all magnetic core structures with respect to distinguishing One and Zero storage. Discrimination ratios of four-to-one or ten-to-one are typical of prior art devices, and although such may generally be tolerated, it frequently happens that deviations either in the windings or in the cores due to normal production tolerances combine to reduce the discrimination actually achieved to ratios of two-to-one or three-to-one. Certain types of output devices cannot distinguish between outputs wherein the One-Zero discrimination is on the order last mentioned, and it is, of course, preferable to provide a discrimination which clearly avoids ambiguity with any standard type of readout device.

Accordingly, it is one object of the present invention to provide a magnetic core read-out circuit having an improved discrimination between One-Zero binary intelligence.

It is a further object of the invention to provide a magnetic core device for handling binary intelligence which includes as a feature thereof, a novel circuit for accomplishing instantaneous or command read-out of the binary states of the cores of such device.

It is a further object of the invention to provide a new method for accomplishing read-out from magnetic core structures.

It has been the practice of the prior art to favor the use of odd or O cores for read-out of magnetic core devices such as shift registers and the like. Referring to U.S. Patent No. 2,995,731 to J. P. Sweeney, this practice would be incorporated by linking the O cores, or at least one of the O cores shown, to provide an output indicative of the storage state of the register or of the single core. On certain occasions the even or E cores of prior art devices have been similarly utilized for read-out. It has been found, however, that discrimination ratios are substantially the same in either case.

In FIGURE 1 of the present application the core structure 10 may be taken to be as described in U.S. application, Ser. No. 305,780 wherein the O and E bit positions are combined in the same physical core structure. The core 10, of course, is of saturable magnetic material including square loop characteristics so as to be capable of achieving stable states of remanent magnetization to define intelligence stored in the O and E halves. The novel core structure described in Ser. No. 305,780 includes a central leg here shown as 12, which has a cross-sectional area and thus magnetic material content approximately twice that of the outer leg of either of the core legs here shown as 14. Because of this, and as described in detail in S.N. 305,780 the core structure may be driven by applied MMF into a number of distinct stable states of magnetization of the type shown in FIGURES 1B–1D. FIGURE 1B shows the Clear or Zero state. It will be observed that the flux orientation is clockwise in both core halves to thus include in the central leg 12 a net flux distribution which is substantially neutral. By an appropriate setting MMF applied to an input winding such as the winding 18 shown in FIGURE 1, the O core half may be set to contain a One with substantially half of the magnetic material of such O half being driven into positive saturation. This is shown in FIGURE 1C.

Figure 1A:
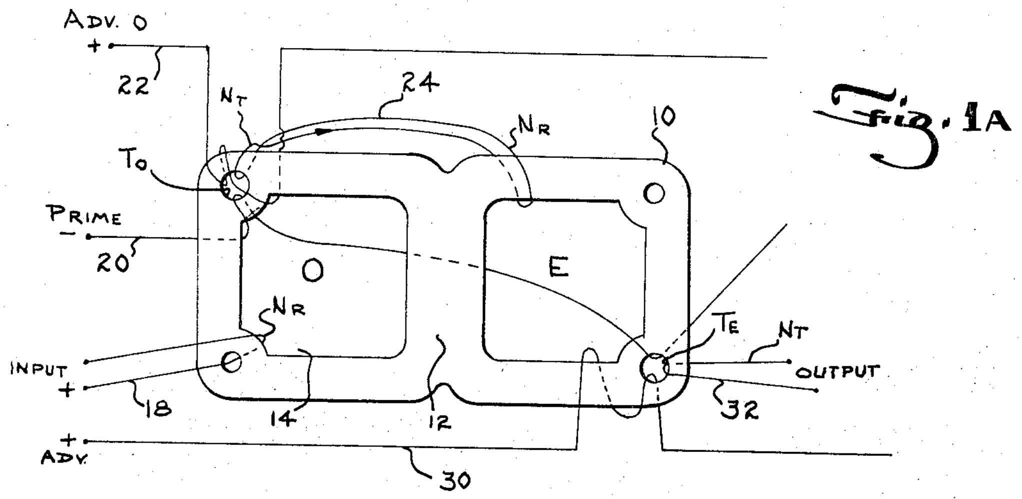
FIGURE 1A is a schematic diagram showing a single core threaded by drive and transfer windings to accomplish a controlled transfer or storage of intelligence states within or from the core.
Figure 1B:
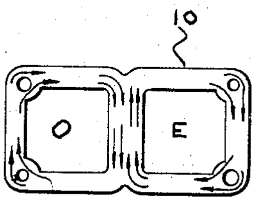
FIGURES 1B, 1C and 1D are diagrams showing the flux orientations representative of the various magnetization states achieved by the core during the operation of the circuit of FIGURE 1A.
Figure 1C:
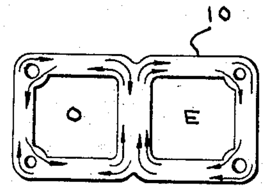
Figure 1D:
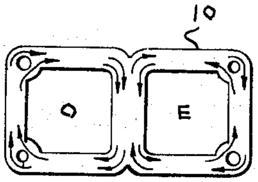

A transfer of the One stored in the O half may be accomplished by utilizing the MAD–R techniques shown and described in S.N. 305,780. Briefly reviewed, this includes the application of a slowly applied priming MMF to the lead shown as 20, which serves to locally reverse flux about the minor aperture $T_O$, followed by the application of a rapidly developed clearing MMF by means of a pulse applied to the ADV.O lead shown as 22, which serves to clear the O half by driving it into negative saturation. This operates to switch flux under the coupling loop labeled 24 to induce a voltage across such coupling loop which develops a current in coupling loop 24 to develop an MMF which sets the E half. The E half Set state shown in FIGURE 1D is accomplished by driving approximately half of the core material into positive saturation. Transfer out of core 10 is accomplished by a further energization of priming winding 20, to locally reverse the flux about minor aperture $T_E$ followed by the application of an ADV.E pulse to develop a clearing MMF on the E core half. This serves to switch flux under the output loop shown as 32 to induce a voltage therein and effect an output current.

A transfer of Zero intelligence, for practical reasons, follows the same cycle with the quantity of flux switched held to be as small as possible.

The core and circuit 10 may, of course, be used singly or in combination with a large number of other cores to form shift registers, logic modules, counters and the like. In many cases, the input winding 18 is from some utility device and the output winding 32 serves as a coupling loop to an adjacent core. Other types of circuits which are used are described in the previously mentioned S.N. 305,780.

Figure 2:
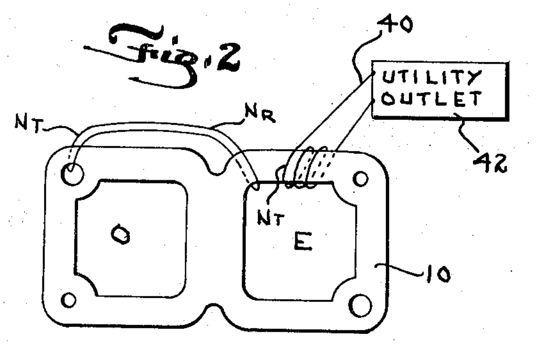
FIGURE 2 is a schematic diagram showing the output circuit of the invention relative to a core structure of the type shown in FIGURES 1A–D.

From the foregoing it can be seen that the core traverses a sequence of distinct magnetization states which each represent intelligence in the binary form of One or Zero. Many circuit applications call for a sampling of the intelligence states traversed by the core or for a direct destructive read-out of the stored intelligence state of the core to accomplish some logic or control function related to the core intelligence content. It has been discovered that read-out may be accomplished with a greater degree of discrimination than heretofore possible, by having the read-out winding on the E core half and taking such read-out at received time. FIGURE 2 shows this with the read-out winding shown as 40 coupled through the major aperture of the E core half and connected to a utility device. The utility device 42 may be considered as a lamp, relay, transistor interface or some similar device capable of responding to pulse type inputs. It has been found that a discrimination ranging from thirty-to-one up to and better than fifty-to-one may be obtained through the proper practice of the invention technique. This substantially improves upon read-out discrimination ratios of prior art techniques.

Figure 3:
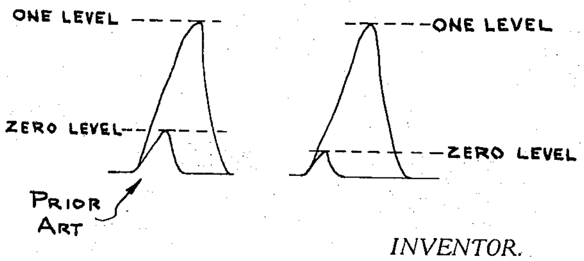
FIGURE 3 is a diagram showing One-Zero voltage levels obtainable with the invention and with prior art techniques.

What is meant by taking the read-out at receive time is that the read-out is actually read when the E core half is receiving. Alternatively expressed, when the O core half is transmitting via loop 24 to the E core half due to being driven into the clear state by the application of advance MMF via winding 22. FIGURE 3 shows a sketch of the One-Zero voltage levels which may be expected if taken in accordance with the invention along with similar values for prior art devices.

In the circuit of FIGURES 1 and 2 the various windings are shown with turns N, the symbol $N_T$ standing for the turns which serve to transmit, and the symbol $N_R$ standing for turns which receive. With respect to the advance circuit, the symbol $N_C$ stands for clear turns on the major aperture and $N_X$ for turns on the minor transmitter aperture, and with respect to the prime circuit $N_P$ stands for turns which serve to prime and $N_B$ stands for turns which serve to apply prime bias. The turns used in an actual circuit were as follows:

Advance circuit:
- $N_C=2T$
- $N_X=2T$

Prime circuit:
- $N_P=3T$
- $N_B=1T$

Input winding:
- $N_R=6T$

Output winding:
- $N_T=30T$

Coupling loop:
- $N_T=2T$
- $N_R=1T$

Read-out winding:
- $N_R=30T$

With this circuit D.C. priming was used of a level approximately 150 milliamperes and the advance pulse employed was approximately 3500 milliamperes in amplitude and 5 microseconds in duration. The core geometry employed was as described in S.N. 305,780. A discrimination ratio of one hundred and fifty-to-one was achieved.

It has been found that the invention method is useful with various types of circuits employing multipath core structures of the type shown in S.N. 305,780 and it should be apparent that the invention is useful with other similar types of magnetic core structures wherein at least two major apertures are present.

While the foregoing description has been generally related to the so-called MAD–R cycle of transfer, and to use with magnetic core circuits, it should also be apparent that the method of the invention is useful in circuits wherein there may be no magnetic core devices, except a single core structure similar to 10 employed as an auxiliary or sampling core. For example, in transistorized circuits wherein binary intelligence states are handled in the standard fashion it is only necessary to employ some available pulse in the circuit to serve the clearing function for each core half and some available current level representative of binary intelligence to set the cores. The only cycle requirement which is necessary is that the MMF developed for clearing each core half be developed at separate times. The priming MMF can, of course, be taken off any available D.C. source of a proper level. With standard transistorized circuits, pulses and currents of the type necessary are usually available in a form which can be employed either directly or through some simple passive network to achieve the proper values. Alternatively, if the current or voltage levels in a given circuit are not of a proper level or cannot be so developed through a simple passive network, a core which is much smaller than that above described in reference to S.N. 305,780 may be employed. The relative dimensions of the core are preferred, but the flux quantities may be reduced to values wherein switching MMF may be reasonably achieved from current voltage levels available. From this it should be apparent that there are many types of circuits which can employ the method of the invention, although the preferred circuit insofar as demonstrating the invention is as described related to the MAD–R circuit and its cycle of operation.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What is claimed is:

1. An improved read-out circuit and device including a magnetic core comprised of an integral structure of saturable magnetic material having a substantially square hysteresis characteristic, including at least two major apertures individually defined by non-common legs of magnetic material of a given flux capacity and by a common leg of magnetic material of substantially twice the flux capacity of the cross-sectional portion of said non-common legs, means linking the material about one aperture to the material about another aperture, means adapted to drive the material about either of said apertures to switch flux therein to define an intelligence state and advance means adapted to sequentially drive the material about said two apertures to switch flux therein to transmit an intelligence state therefrom, a read-out means linking one of said major apertures and adapted to provide a read-out of the intelligence state as the other of said apertures is driven by said advance means.

References Cited

UNITED STATES PATENTS 3,050,715 8/1962 Stabler ............ 340—174

TERRELL W. FEARS, *Primary Examiner*.

JAMES W. MOFFITT, *Examiner*.